UNITED STATES PATENT OFFICE.

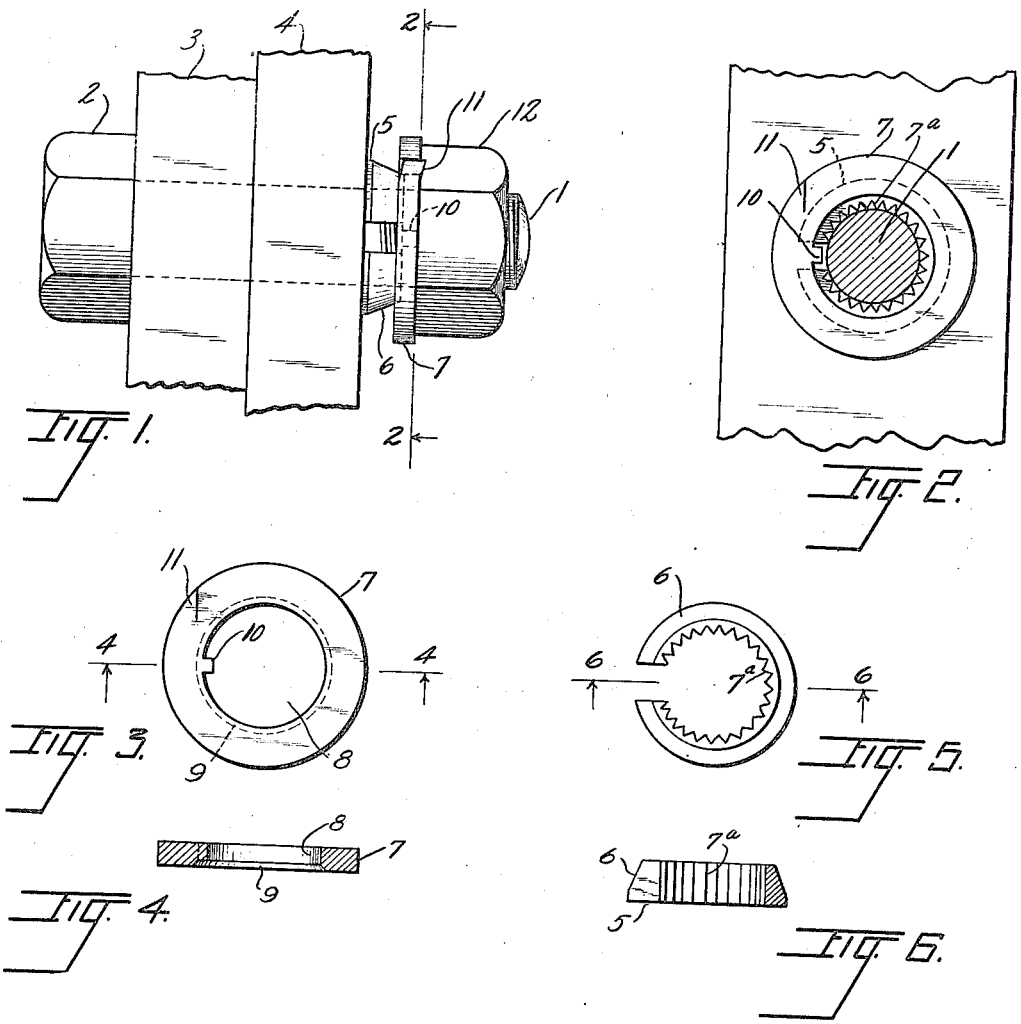

VALE JOKELA, OF BRANTWOOD, WISCONSIN.

NUT AND BOLT LOCK.

1,283,204.　　　　Specification of Letters Patent.　　Patented Oct. 29, 1918.

Application filed March 30, 1918. Serial No. 225,805.

*To all whom it may concern:*

Be it known that I, VALE JOKELA, a citizen of the United States, residing at Brantwood, in the county of Price and State of Wisconsin, have invented certain new and useful Improvements in Nut and Bolt Locks, of which the following is a specification.

This invention relates to improvements in nut and bolt locks and its object is to provide simple and efficient means for locking a nut upon a bolt. With the foregoing and other objects in view the invention consists in the combination and arrangement of parts to be hereinafter fully described, pointed out in the appended claims and illustrated in the accompanying drawing which forms a part of this specification and in which—

Figure 1 is a view of my improved device in side elevation illustrating its application.

Fig. 2 is a cross section taken on line 2—2 of Fig. 1.

Fig. 3 is a plan view of the clamping collar employed.

Fig. 4 is a cross section taken on line 4—4 of Fig. 3.

Fig. 5 is a plan view of the beveled split collar employed.

Fig. 6 is a cross section taken on line 6—6 of Fig. 5.

Like reference characters denote corresponding parts throughout.

The reference numeral 1 denotes a terminally threaded bolt having a head 2 and the numerals 3, 4 denote the work to which the bolt is applied. About the threaded end of the bolt 1 I place a split collar 5 which is formed with a beveled portion 6 and with the inner peripheral teeth 7ª, said collar being adapted to abut the work. This collar is preferably made of a resilient material and may be introduced over the threaded end of the bolt or its ends manually forced apart to permit the passage therebetween of the bolt body, the beveled portion 6 of the collar being disposed outwardly or away from the work.

After the split collar has been applied to the bolt I next apply a clamping collar 7 which is formed about its central opening 8 with the annular groove 9 and with the lug 10 which projects into the said opening 8. The collar 7 is applied to the threaded end of the bolt, its grooved face first, the lug 10 moving over the bolt-threads until it engages with the split collar 5. The collars 5 and 7 are then so adjusted that the lug 10 is disposed between the ends of the split collar to prevent rotation of the same, and the grooved face of the collar 7 engaging with the beveled portion 6 of the split collar. The teeth 7ª of collar 5 will bite into the bolt body and so relative rotary movement of the collars 5, 7 upon the bolt body is prevented.

It is noted that the collar 7 is formed upon its non-grooved face with a rib 11 which is bent out from that face, the purpose of said rib being hereinafter set forth. With the collars 5 and 7 in place upon the bolt the nut 12 is now introduced upon the bolt in the usual manner and moved into engagement with the clamping collar and with the said rib 11 which is so inclined or disposed as to engage with one face of the nut as the same is moved against the said collar 7. In moving against the collar 7 the nut can be forced into frictional engagement with the rib which rib will then operate to prevent a reverse movement of the nut by wear and so a positive means of securing the nut to the bolt is provided.

What is claimed is:—

1. In a nut and bolt lock, a split collar having a beveled exterior periphery and a toothed inner periphery to engage the bolt threads, a clamping collar adapted for frictional engagement with the beveled portion of said split collar, a lug formed upon said clamping collar for insertion between the ends of said split collar, and means carried by said clamping collar for frictional engagement with the nut.

2. In a nut and bolt lock, a split collar having a beveled exterior periphery and a toothed inner periphery to engage the bolt threads, a clamping collar adapted for frictional engagement with the beveled portion of said split collar, a lug formed upon said clamping collar for insertion between the ends of said split collar, and a rib formed upon said clamping collar for frictional engagement with the nut.

3. In a nut and bolt lock, a split collar having a beveled exterior periphery and a toothed inner periphery to engage the bolt threads, a clamping collar formed with an annular grooved portion for frictional engagement with the beveled portion of said split collar, a lug formed upon said clamping collar and projected into the central opening thereof for insertion between the ends of said split collar, and a rib formed upon said clamping collar for frictional engagement with the nut.

In testimony that I claim the foregoing as my own I have hereto affixed my signature in the presence of two subscribing witnesses.

VALE JOKELA.

Witnesses:
 ALEX. SANDQUIST,
 JOHN RAMULA.